(12) United States Patent
Wolf

(10) Patent No.: US 11,542,863 B1
(45) Date of Patent: Jan. 3, 2023

(54) METHOD AND DEVICE TO IMPROVE THE PERFORMANCE OF A POWER PLANT INTEGRATED WITH A THERMAL ENERGY STORAGE SYSTEM

(71) Applicant: Siemens Energy, Inc., Orlando, FL (US)

(72) Inventor: Thorsten Wolf, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 0 days.

(21) Appl. No.: 17/455,099

(22) Filed: Nov. 16, 2021

(51) Int. Cl.
| | | |
|---|---|---|
| *F02C 6/14* | (2006.01) | |
| *F02C 6/18* | (2006.01) | |
| *F22B 1/18* | (2006.01) | |
| *F01K 7/06* | (2006.01) | |
| *F01K 23/10* | (2006.01) | |

(52) U.S. Cl.
CPC .............. *F02C 6/18* (2013.01); *F01K 7/06* (2013.01); *F01K 23/106* (2013.01); *F02C 6/14* (2013.01); *F22B 1/1815* (2013.01); *Y02E 60/14* (2013.01)

(58) Field of Classification Search
CPC ........................................... F01K 23/10
See application file for complete search history.

(56) References Cited

U.S. PATENT DOCUMENTS

| | | | |
|---|---|---|---|
| 3,204,407 A * | 9/1965 | Meissenberg et al. ..................... | F01K 23/103 122/1 R |
| 3,953,966 A * | 5/1976 | Martz ..................... | F01K 13/02 60/773 |
| 4,118,934 A * | 10/1978 | Brola ....................... | F25B 27/00 60/647 |
| 4,286,141 A * | 8/1981 | MacCracken ....... | F28D 20/0056 60/659 |
| 5,365,730 A * | 11/1994 | Bruckner .............. | F01K 23/103 60/39.15 |
| 5,904,138 A * | 5/1999 | Keintzel ................. | F03G 6/064 126/609 |
| 9,410,748 B2 * | 8/2016 | Schneider ............. | F28D 20/023 |
| 2006/0162315 A1 * | 7/2006 | Bruckner .............. | F22B 1/1861 60/39.182 |
| 2012/0168111 A1 * | 7/2012 | Soukhojak ............ | F28D 15/043 165/10 |
| 2012/0317981 A1 * | 12/2012 | Perego ...................... | F22B 1/18 29/888 |

(Continued)

FOREIGN PATENT DOCUMENTS

| | | | | |
|---|---|---|---|---|
| CN | 106953352 A | * | 7/2017 | ............... C10G 9/20 |
| GB | 2182395 A | * | 5/1987 | ............... C10G 9/20 |

*Primary Examiner* — Todd E Manahan
*Assistant Examiner* — Marc J Amar

(57) ABSTRACT

A power plant is provided including a heat recovery steam generator positioned to receive a flow of an exhaust gas and having a heating surface, an exhaust gas recirculation line branching off at an extraction point within the heat recovery steam generator and opening into the heat recovery steam generator at an injection point upstream of the extraction point within the heat recovery steam generator, a thermal storage system arranged between the extraction point and the injection point in the exhaust gas recirculation line wherein the thermal energy storage system stores thermal energy, and a blower arranged in the exhaust gas recirculation line to push air or exhaust gas through the thermal energy storage system.

16 Claims, 7 Drawing Sheets

(56) References Cited

U.S. PATENT DOCUMENTS

| | | | |
|---|---|---|---|
| 2014/0096532 A1* | 4/2014 | Broderick | F02C 6/18 |
| | | | 60/774 |
| 2015/0241136 A1* | 8/2015 | Maeda | F28D 20/02 |
| | | | 165/10 |
| 2021/0396159 A1* | 12/2021 | Migl | F01K 23/10 |
| 2022/0003456 A1* | 1/2022 | Fang | F24D 17/02 |
| 2022/0049631 A1* | 2/2022 | Deng | F02C 6/18 |

* cited by examiner

US 11,542,863 B1

METHOD AND DEVICE TO IMPROVE THE PERFORMANCE OF A POWER PLANT INTEGRATED WITH A THERMAL ENERGY STORAGE SYSTEM

BACKGROUND

Currently, renewable energy generation is increasing. Renewable energy in the form of generated electricity and heat is derived from natural processes that are replenished constantly. For the purposes of this disclosure, renewable energy may include solar energy, wind energy, hydropower, biomass, geothermal energy, biofuels, and hydrogen derived from renewable sources. Unlike other forms of energy generation, renewable energy can only be generated at certain times, i.e., when the sun is shining (solar energy harvesting) or when the wind is blowing (wind power generation). If there is no demand for the renewable energy at the time of generation, curtailment or switching off the generating assets and reducing the renewable power generation, may occur. With increased energy generation due to renewables, losses due to curtailment are increasing exponentially.

Most fossil assets, including gas power generation plants, were built for continuous base load operation. With increasing renewable power generation, these plants operate with daily starts and stops creating additional thermal wear and tear and start-up emissions. Additionally, the result of starting and stopping a power plant is reduced efficiency. Thus, it may be desirable to utilize the surplus renewable energy to improve the performance and flexibility of a power plant.

BRIEF SUMMARY

In one aspect, a power plant is provided including a heat recovery steam generator positioned to receive a flow of an exhaust gas and having a heating surface, an exhaust gas recirculation line branching off at an extraction point within the heat recovery steam generator and opening into the heat recovery steam generator at an injection point upstream of the extraction point within the heat recovery steam generator, a thermal storage system arranged between the extraction point and the injection point in the exhaust gas recirculation line wherein the thermal energy storage system stores thermal energy, and a blower arranged in the exhaust gas recirculation line to push air or exhaust gas through the thermal energy storage system.

In another aspect, a method to improve the performance of a power plant integrated with a thermal energy storage system is provided. The power plant includes a heat recovery steam generator that receives a flow of exhaust gas from a gas turbine. The method includes extracting a portion of an exhaust gas at an extraction point within the heat recovery steam generator into an exhaust gas recirculation line, pushing the exhaust gas in the exhaust gas recirculation line through a thermal energy storage system, heating a thermal energy storage material using the exhaust gas, and injecting the heated exhaust gas from the thermal energy storage at an injection point upstream of the extraction point within the heat recovery steam generator.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

The re-electrification of stored thermal energy in a power plant is characterized by two key performance parameters. One is storage capacity, or the amount of thermal energy stored in the system. The other is the re-electrification efficiency or the efficiency of the conversion of thermal energy into power. By manipulating the charge and discharge temperatures of the proposed system both performance parameters can be influenced in order to optimize the economic results of the system.

Figure 1:
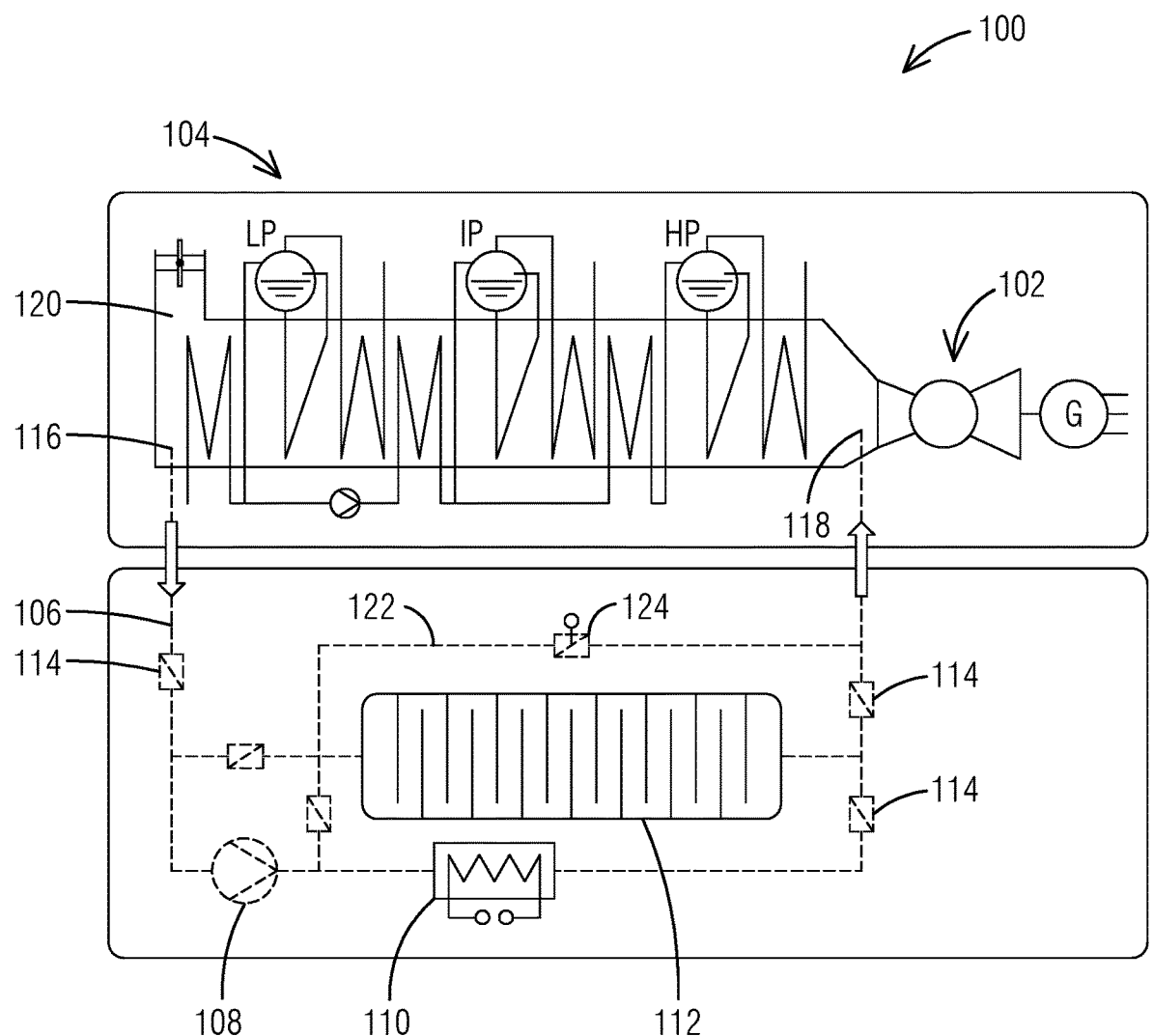
FIG. 1 illustrates a schematic of an embodiment of a power plant utilizing a thermal storage core.

FIG. 1 illustrates a power plant 100 including a gas turbine 102 and heat recovery steam generator 104 connected downstream of the gas turbine 102 in the direction of flow of an exhaust gas. The heat recovery steam generator 104 includes at least one heating surface. As shown in FIG. 1, the heating surface may include a high-pressure section (HP), an intermediate pressure-section (IP), and a low-pressure section (LP). The heat recovery steam generator 104 may include all types of boilers including drum-type or once-through, as well as vertical or horizontal. An exhaust gas recirculation line 106 branches off at a first extraction point 116 within the heat recovery steam generator 104 and opens back into the heat recovery steam generator 104 at a first injection point 118 upstream of the first extraction point 116. In an embodiment, as shown in FIG. 1, the first extraction point 116 is at the stack 120, where exhaust gas is released into the outside air. A plurality of controllable dampers 114 may be positioned within the recirculation line 106 to regulate and reverse the flow of air and/or exhaust gas. Positioned within the recirculation line 106 is a thermal energy storage system 112. A blower 108 is arranged within the recirculation line 106 in order to push the air and/or exhaust gas through the thermal energy storage system 112. Also arranged in the recirculation line 106 is a heater 110 to heat up air and/or exhaust gas pushed by the blower 108. The heat recovery steam generator 104 may be connected to a steam turbine or any other steam consumer (not shown).

The thermal energy storage system 112 may include a solid thermal storage material that can absorb and store heat. In an embodiment, the solid thermal storage material is volcanic rocks which is an inexpensive and environmentally harmless storage solution that may be housed in a storage core and connected to the heat recovery steam generator 104. It should be understood that other forms of thermal storage materials, such as ceramics, sand, glass, molten salts or molten aluminum, and liquids may be utilized as well.

Figure 2:
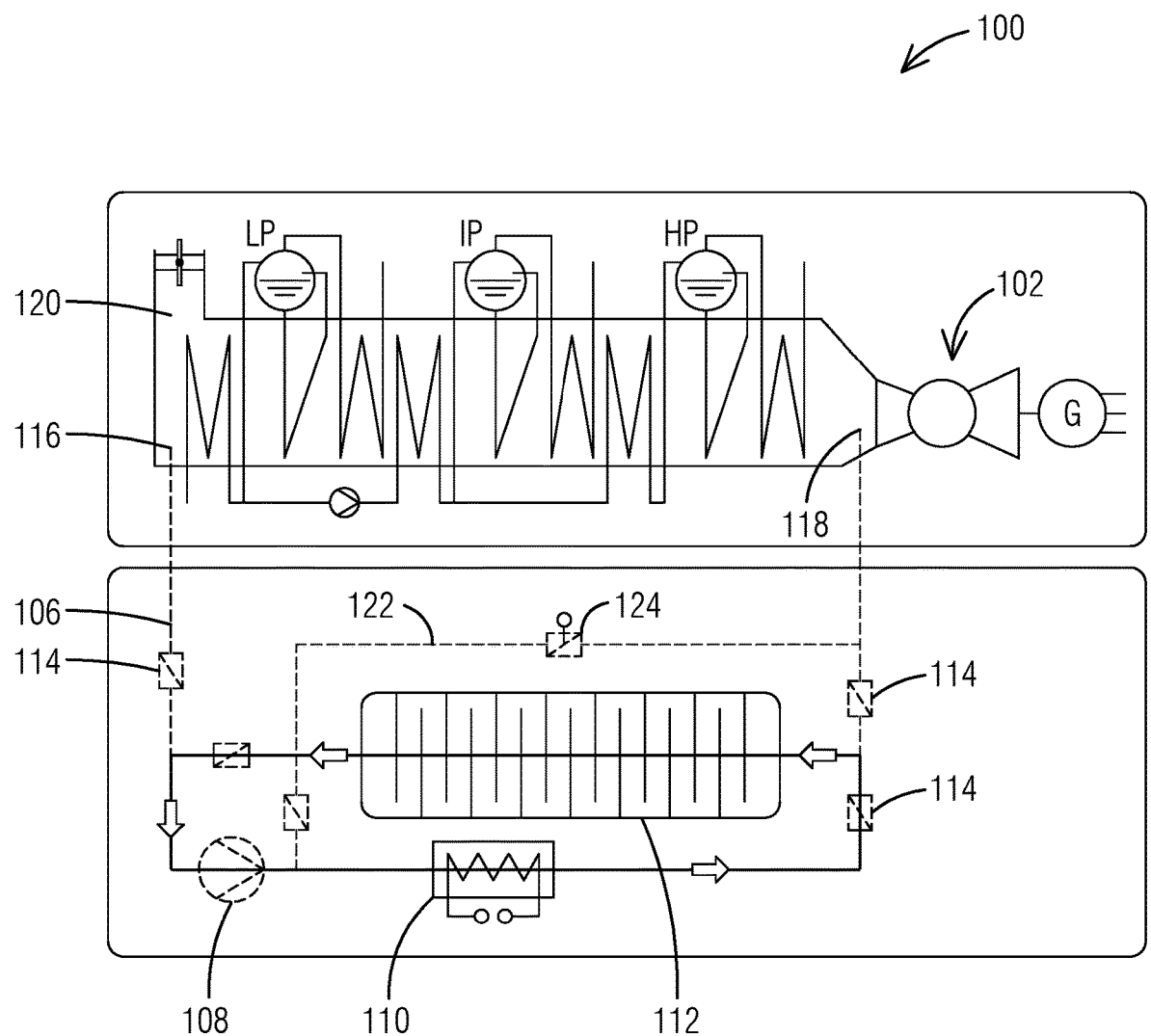
FIG. 2 illustrates a schematic of an embodiment of a power plant in a charging mode.

FIG. 2 illustrates the power plant 100 in a charging mode when the power plant 100 is not in operation. In this embodiment, the dampers 114 connected respectively to the first extraction point 116 and the first injection point 118 are closed so that air circulates through the thermal energy storage system 112 to heat up the solid thermal storage material. For example, the heater 110 receives an electrical energy to heat up a relatively cool air pushed by the blower 108. The heated air flows from the heater 110 through the recirculation line 106 into the thermal energy storage system 112, as shown in FIG. 2, wherein it is absorbed by the solid thermal storage material with the result that a temperature of solid thermal storage material increases. The solid thermal storage material may be heated to a temperature as high as 750 degrees Celsius with a volume of volcanic rocks of approximately 2500 tons, for example. A relatively cooler air flows out of the thermal energy storage system 112 and back to the blower 108. In an embodiment, the received electrical energy is a surplus renewable energy. Thus, in the charging mode, the power plant 100 may store excess electrical energy in the form of thermal energy during periods of excess electrical generation that may be available in an electrical grid, for example.

Figure 3:
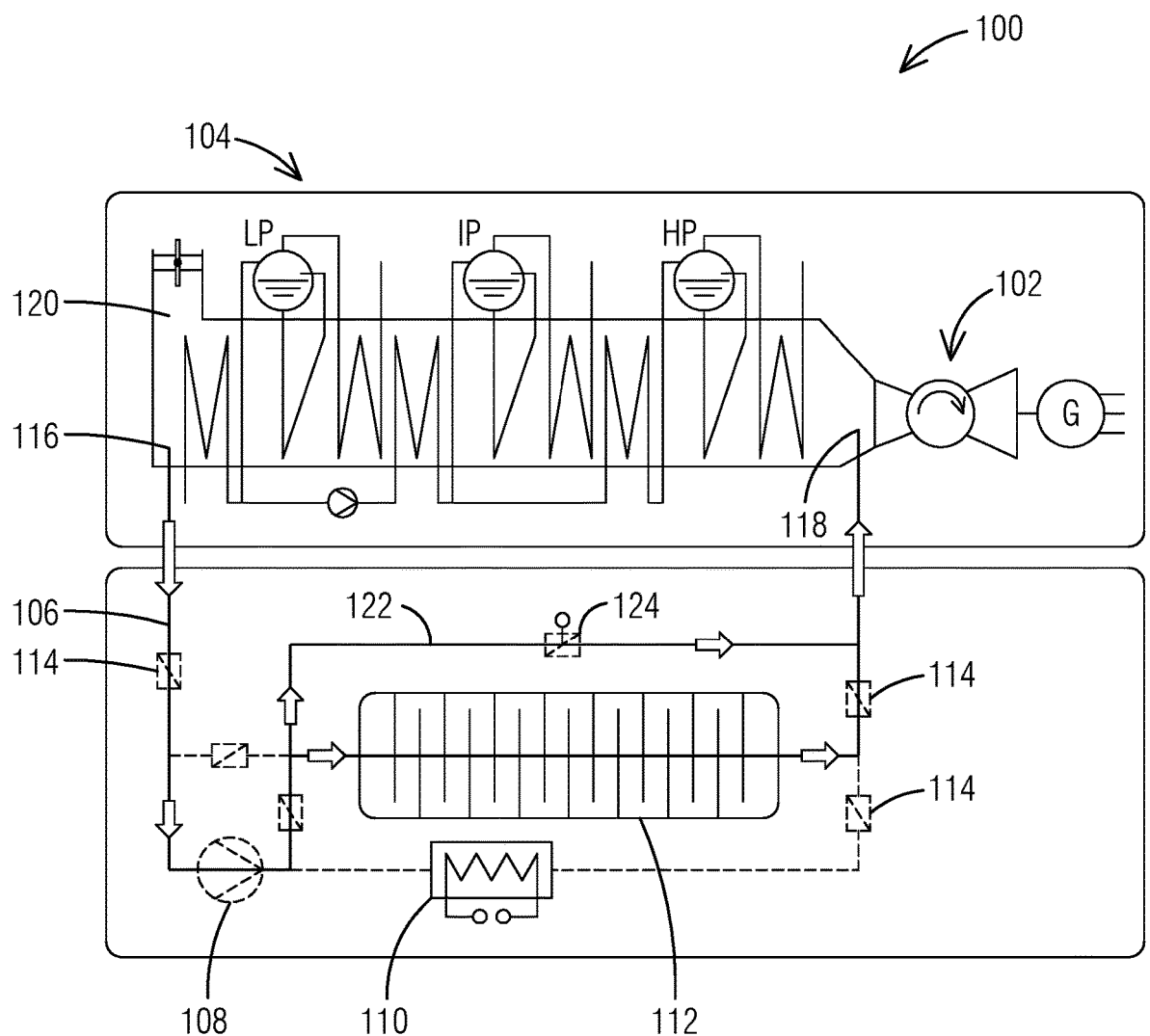
FIG. 3 illustrates a schematic of an embodiment of a power plant in a discharging mode.

FIG. 3 illustrates the power plant 100 in a discharging mode when the power plant 100 is in operation. The dampers 114 in the recirculation line 106 leading into the heat recovery steam generator 104 at the first extraction point 116 and the first injection point 118 are opened. A relatively cold (between 70 and 100 degrees Celsius, approximately) exhaust gas flowing through the heat recovery steam generator 104 is extracted at the first extraction point 116. The blower 108 pushes the exhaust gas through the thermal energy storage system 112, which possesses stored thermal energy, where it is heated up. This heated exhaust gas may then be injected back into the heat recovery steam generator 104 at the first injection point 118. Thus, the bottoming cycle of the power plant 100 converts the thermal energy into electricity. In an embodiment, the discharge temperature, or the exhaust gas injected into the heat recovery steam generator 104, may be up to 750 degrees Celsius. Thus, in the discharging mode, the hot thermal energy stored in the thermal energy storage system 112 is moved into the heat recovery steam generator 104 via the first injection point 118.

In an embodiment, a bypass line 122 extends parallel to the thermal energy storage system 112 so that the relatively cold exhaust gas may be mixed with the heated exhaust gas from the thermal energy storage system 112 prior to the first injection point 118 to modify the temperature of the injected exhaust gas. A temperature control valve 124 arranged within the bypass line 122 may be utilized to control how much cold exhaust gas is mixed with the heated exhaust gas thereby controlling the temperature of the injected exhaust gas.

Figure 4:
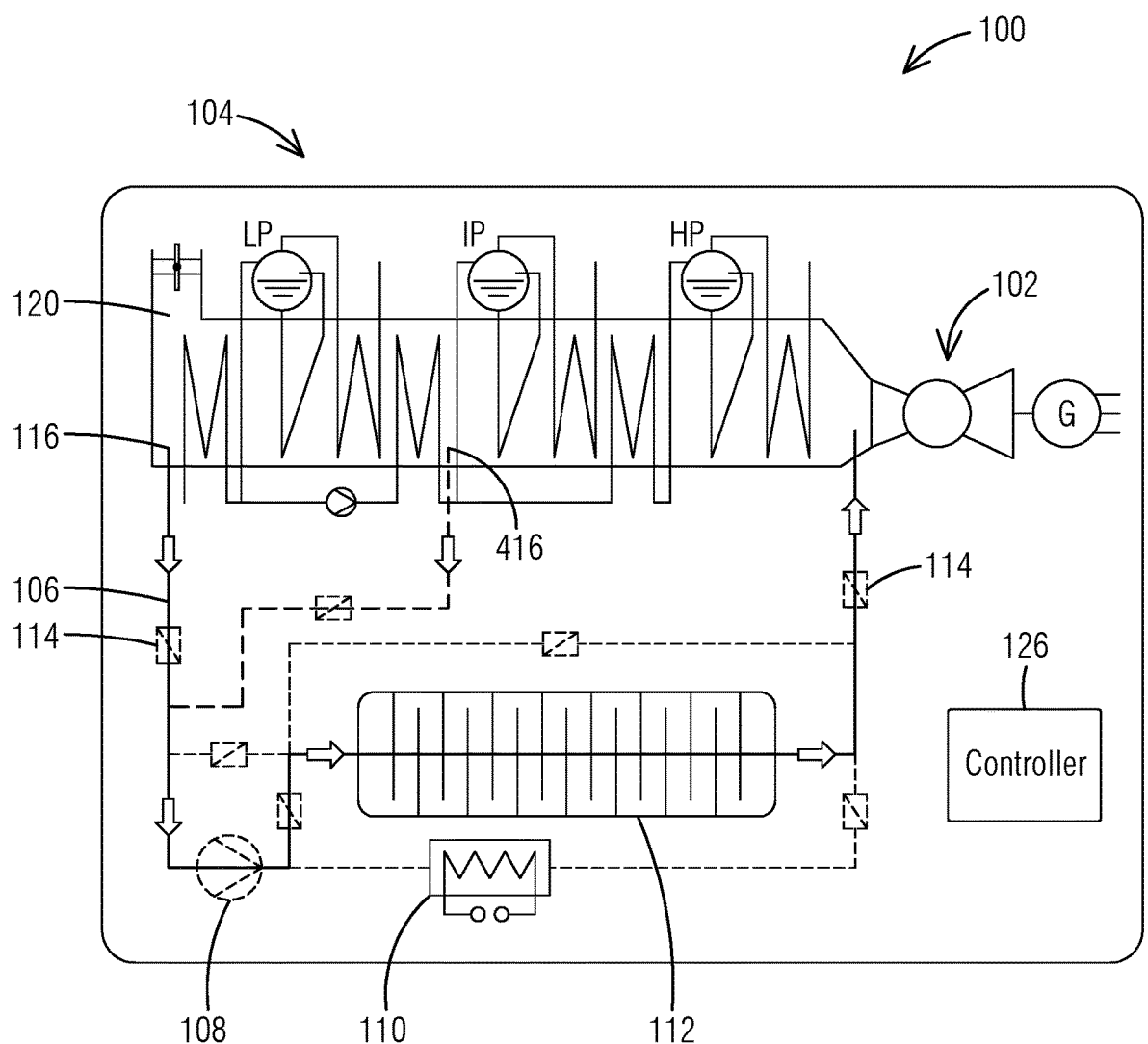
FIG. 4 illustrates a schematic of an embodiment of a power plant having two extraction points.

In an embodiment, the recirculation line 106 includes two extraction points 116, 416 within the heat recovery steam generator 104 to extract exhaust gas at different temperatures within the heat recovery steam generator 104 as shown in FIG. 4. The first extraction point 116 is upstream of a second extraction point 416 within the heat recovery steam generator 104. When the exhaust gas temperature to the thermal energy storage system 112 is low due to extraction at the stack 120, the storage capacity is higher but the efficiency of the re-electrification is low due to the lower average temperature level of the energy transferred to the thermal cycle. By extracting exhaust gas at the first extraction point 116 upstream of the second extraction point 416, the exhaust gas temperature to the thermal energy storage system 112 is higher. This reduces storage capacity but improves the efficiency of the power plant 100 due to higher average temperature level of the thermal energy transferred to the bottoming cycle. A controller 126, operably connected to the power plant 100, may be utilized to choose the correct extraction point 116, 416 by selectively opening the corresponding damper 114 at the extraction point 116, 416 to enable a flow of exhaust gas into the recirculation line 106 from the respective extraction point 116, 416. Choosing the correct extraction point 116, 416 enables operation of the thermal energy storage system 112 based on energy demand and desired efficiency of the power plant 100. In further embodiments, the recirculation line 106 may include more than two extraction points. An example may be seen in FIG. 7 showing three extraction points 116, 416, 516 within the heat recovery steam generator 104.

Figure 7:
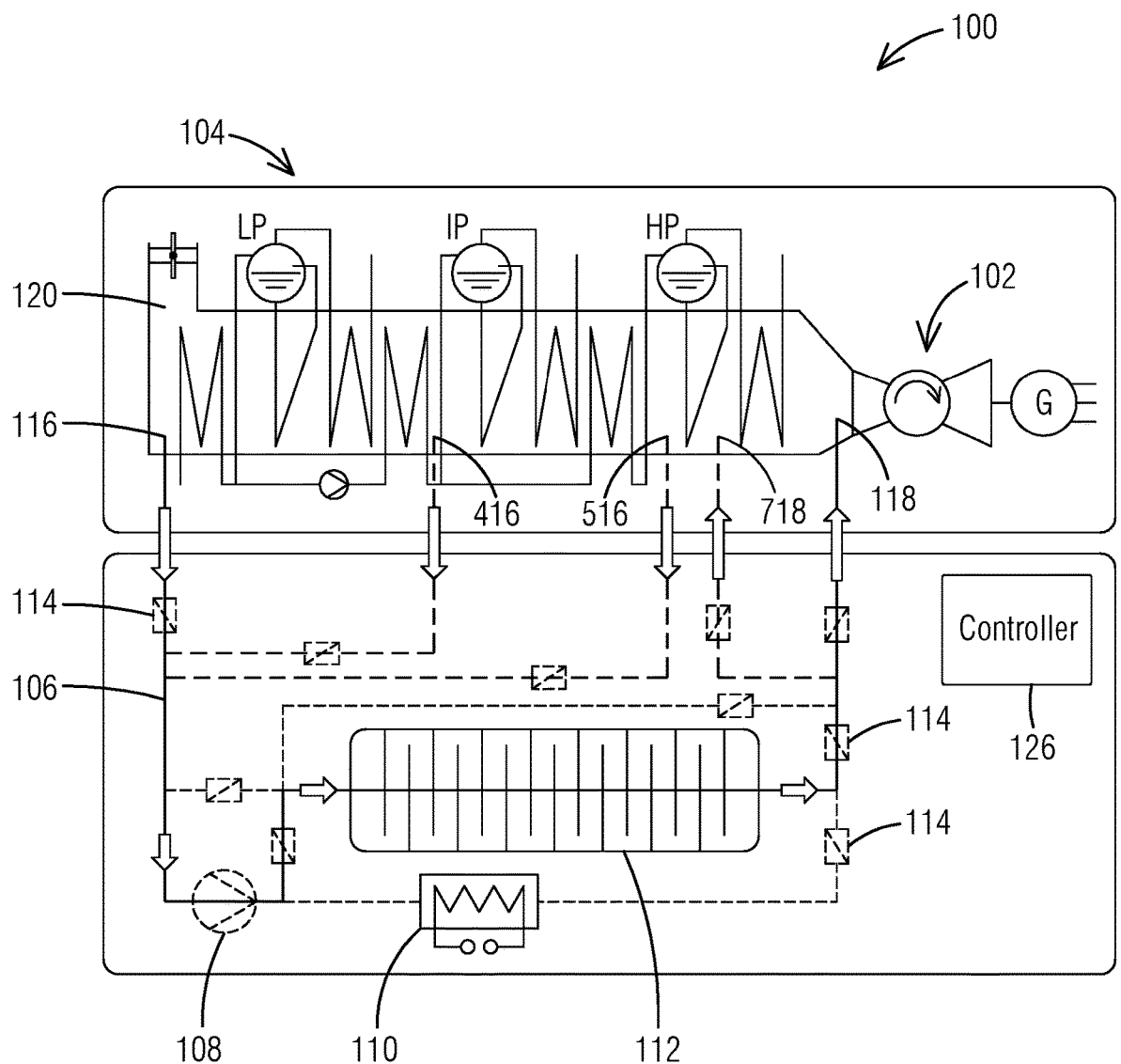
FIG. 7 illustrates a schematic of an embodiment of a power plant having multiple extraction points and multiple injection points.

Similarly, the recirculation line 106 may include two injection points 118, 718 as seen in FIG. 7. A second injection point 718 be disposed downstream of the first injection point 118 disposed at the inlet of the heat recovery steam generator 104. In an embodiment, the second injection point 718 is disposed at the high-pressure evaporator of the heat recovery steam generator 104. Depending on the ambient temperature, which influences the power and exhaust gas condition of the gas turbine 102, and the power plant 100 operation, it may be more beneficial and/or efficient to inject additional energy just in front of the HP section of the heat recovery steam generator 104. In an embodiment, the controller 126 adjusts the split of flow (and energy) between both injection points 118, 718. As a result of adjusting the split of flow, the efficiency of additional electrical output divided by the thermal energy injected can be optimized. In addition, the controller 126 may be used to change the injection flow gradually from the first injection point 118 to the second injection point 718 and back again from the second injection point 718 to the first injection point 118.

In an embodiment, when the power plant 100 is in a start-up mode, air heated up by the thermal energy storage system 112 may be circulated through the heat recovery steam generator 104 to maintain a threshold temperature prior to full operation. Thus, a cold start of the power plant 100 may be converted to a hot restart of the power plant 100. When a power plant 100 is shut down, for example, after approximately 8 hours, the high-pressure drum pressure (HP) is too low to produce seal steam resulting in a loss of the condenser vacuum and a lengthy low load hold to pull the vacuum. Using the thermal energy storage system 112 to keep the heat recovery steam generator 104 warm during a power plant shutdown would prevent this issue from occurring. Additionally, by maintaining a threshold temperature in the heat recovery steam generator 104, the start-up time of the power plant 100 is reduced with the advantage of reduced emissions.

Figure 5:
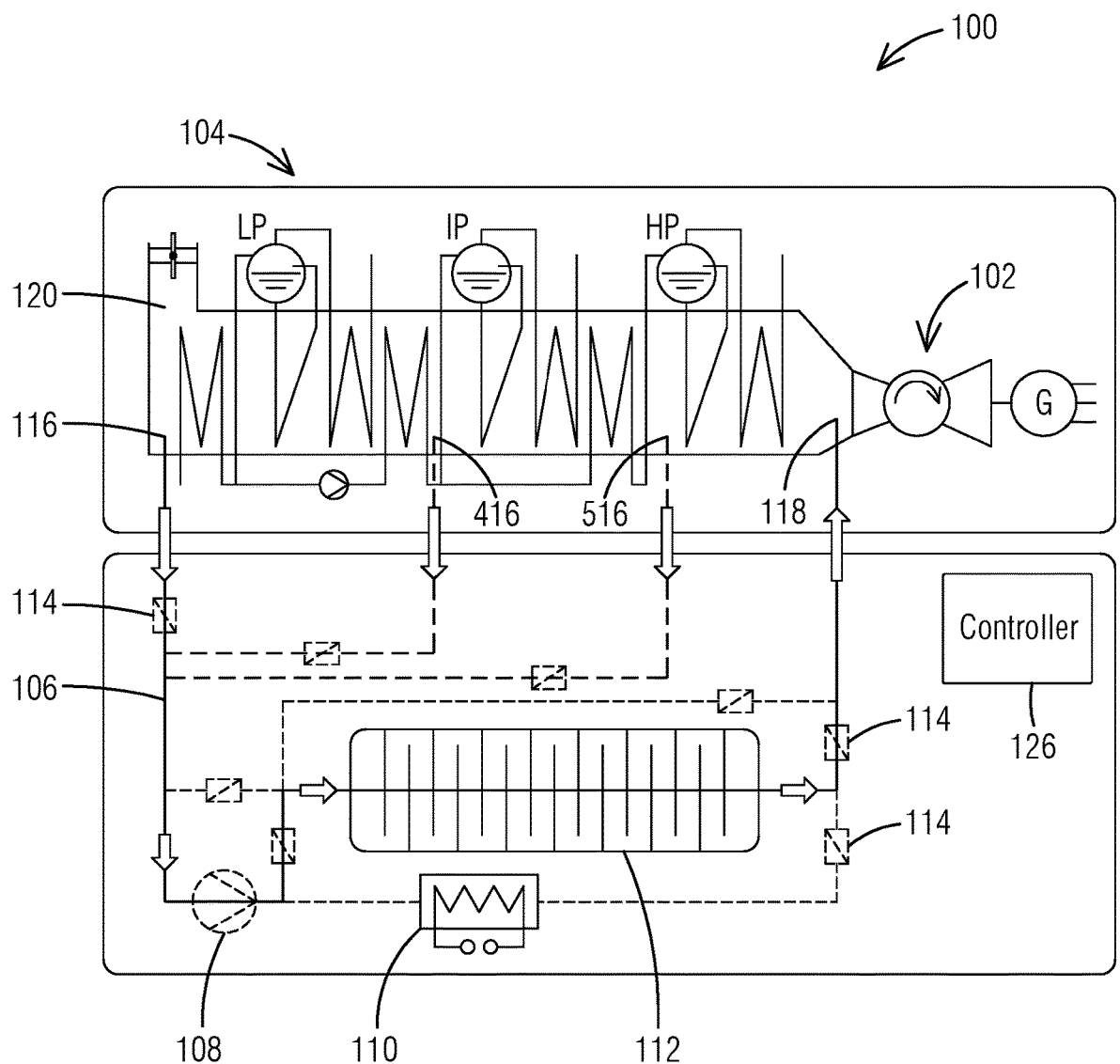
FIG. 5 illustrates a schematic of an embodiment of a power plant in a start-up mode.
Figure 6:
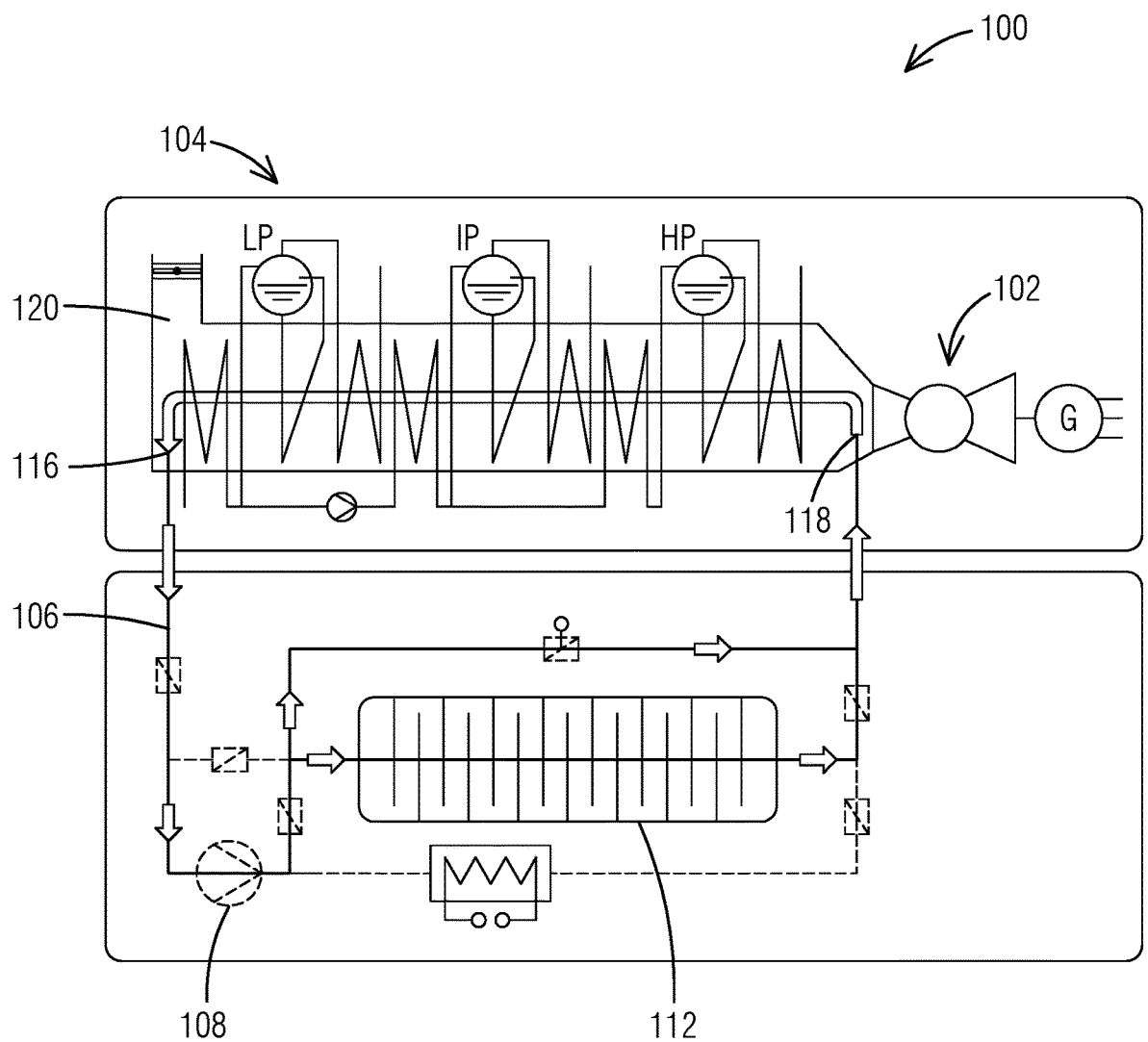
FIG. 6 illustrates a schematic of an embodiment of a power plant having more than two extraction points.

Referring now to FIG. 5, relatively cold air may be extracted into the recirculation line 106 via the first extraction point 116 at the stack 120. The blower 108 pushes the air through the thermal energy storage system 112 heating up the air which is then injected into the heat recovery steam generator 104 at the first injection point 118 as shown. In order to simply circulate the warm air through the heat recovery steam generator 104, the stack damper is closed.

In operation, the proposed power plant integrated with a thermal energy storage system enables utilizing electrical energy, such as surplus renewable energy, to heat up a solid thermal storage material to be used for re-electrification of the power plant at a later time. The storage material may be housed onsite to absorb and release heat and can be connected to the power plant via ducts and dampers. When the stored thermal energy is needed by the power plant, air is blown through the storage material and injected into the heat recover steam generator to generate electricity. The proposed solution can be retrofitted for existing heat recovery steam generators/power plants, so that surplus energy, particularly renewable energy, may be utilized.

The re-electrification of the power plant is thus accomplished by injecting a hot gas into the heat recovery steam generator resulting in an overall roundtrip re-electrification efficiency of 34-38% depending on cycle design and steam parameters. Additionally, utilizing volcanic rocks as a storage medium enables a huge volume of an inexpensive storage material to as a thermal energy storage system.

What is claimed is:

1. A power plant, comprising:
    a heat recovery steam generator positioned to receive a flow of an exhaust gas, the heat recovery steam generator comprising a heating surface;
    an exhaust gas recirculation line branching off at a first extraction point within the heat recovery steam generator and opening into the heat recovery steam generator at a first injection point upstream of the first extraction point within the heat recovery steam generator;
    a thermal energy storage system arranged between the first extraction point and the first injection point in the exhaust gas recirculation line wherein the thermal energy storage system stores thermal energy; and
    a blower arranged in the exhaust gas recirculation line to push air or exhaust gas through the thermal energy storage system;
    a temperature control valve arranged in a bypass line parallel to the thermal energy storage system utilized to modify a temperature of the heated exhaust gas injected into the heat recovery steam generator, the bypass line carrying a portion of the extracted exhaust gas,
    wherein a portion of the exhaust gas received by the heat recovery steam generator is extracted via the first extraction point,
    wherein the blower pushes the exhaust gas through the solid thermal storage material, the solid thermal storage material heats the exhaust gas, and
    wherein the heated exhaust gas is injected in the heat recovery steam generator via the first injection point, and
    wherein the temperature of the heated exhaust gas injected into the heat recovery steam generator is modified by controlling a flow of the portion of exhaust gas to be mixed with the heated exhaust gas.
2. The power plant of claim 1, wherein the thermal energy storage system comprises a solid thermal storage material.
3. The power plant of claim 2, wherein the solid thermal storage material includes volcanic rocks.
4. The power plant of claim 2, further comprising:
    an electrical heater receiving an electrical energy to heat the air pushed by the blower,
    wherein the heated air is blown through the solid thermal storage material to heat the solid thermal material.
5. The power plant of claim 1, wherein the thermal energy storage system comprises a liquid thermal storage material.
6. The power plant of claim 1, wherein the exhaust gas recirculation line includes a second extraction point within the heat recovery steam generator to extract exhaust gas from the heat recovery steam generator.
7. The power plant of claim 6, wherein the first extraction point is upstream of the second extraction point.
8. The power plant of claim 6, further comprising a controller operable in response to at least one of an energy demand and desired efficiency to selectively open one of the first extraction point and a second extraction point.
9. The power plant of claim 1, wherein a control damper is arranged in the recirculation line.
10. The power plant of claim 1, wherein the first injection point is at an inlet of the heat recovery steam generator.
11. The power plant of claim 10, wherein a second injection point is at a high-pressure evaporator of the heat recovery steam generator.
12. The power plant of claim 11, wherein a controller adjusts injection flow between the first injection point and the second injection point.
13. A method to improve the performance of a power plant integrated with a thermal energy storage system, the power plant including a heat recovery steam generator that receives a flow of exhaust gas from a gas turbine, the method comprising:
    heating a fluid by an electrical heater receiving an electrical energy;
    pushing the heated fluid through a solid thermal material within a thermal energy storage system to heat the solid thermal material;
    extracting a portion of an exhaust gas at a first extraction point within the heat recovery steam generator into an exhaust gas recirculation line;
    pushing the exhaust gas in the exhaust gas recirculation line through the thermal energy storage system;
    heating the exhaust gas with the heated solid thermal material;
    utilizing a temperature control valve arranged in a bypass line parallel to the thermal energy storage system to modify a temperature of the heated exhaust gas, the bypass line carrying a portion of the heated exhaust gas; and
    injecting the heated exhaust gas from the thermal energy storage at an injection point upstream of the first extraction point within the heat recovery steam generator.
14. The method as claimed in claim 13, wherein the exhaust gas recirculation line further includes a second extraction point.
15. The method as claimed in claim 14, further comprising selectively choosing by a controller which extraction point is used to extract the portion of the exhaust gas depending on energy demand and the desired efficiency.
16. The method as claimed in claim 15, wherein the first extraction point or the second extraction point is selectively chosen by opening a control damper arranged in the exhaust gas recirculation line to enable a flow of exhaust gas into the exhaust gas recirculation line.

* * * * *